Figure 1:
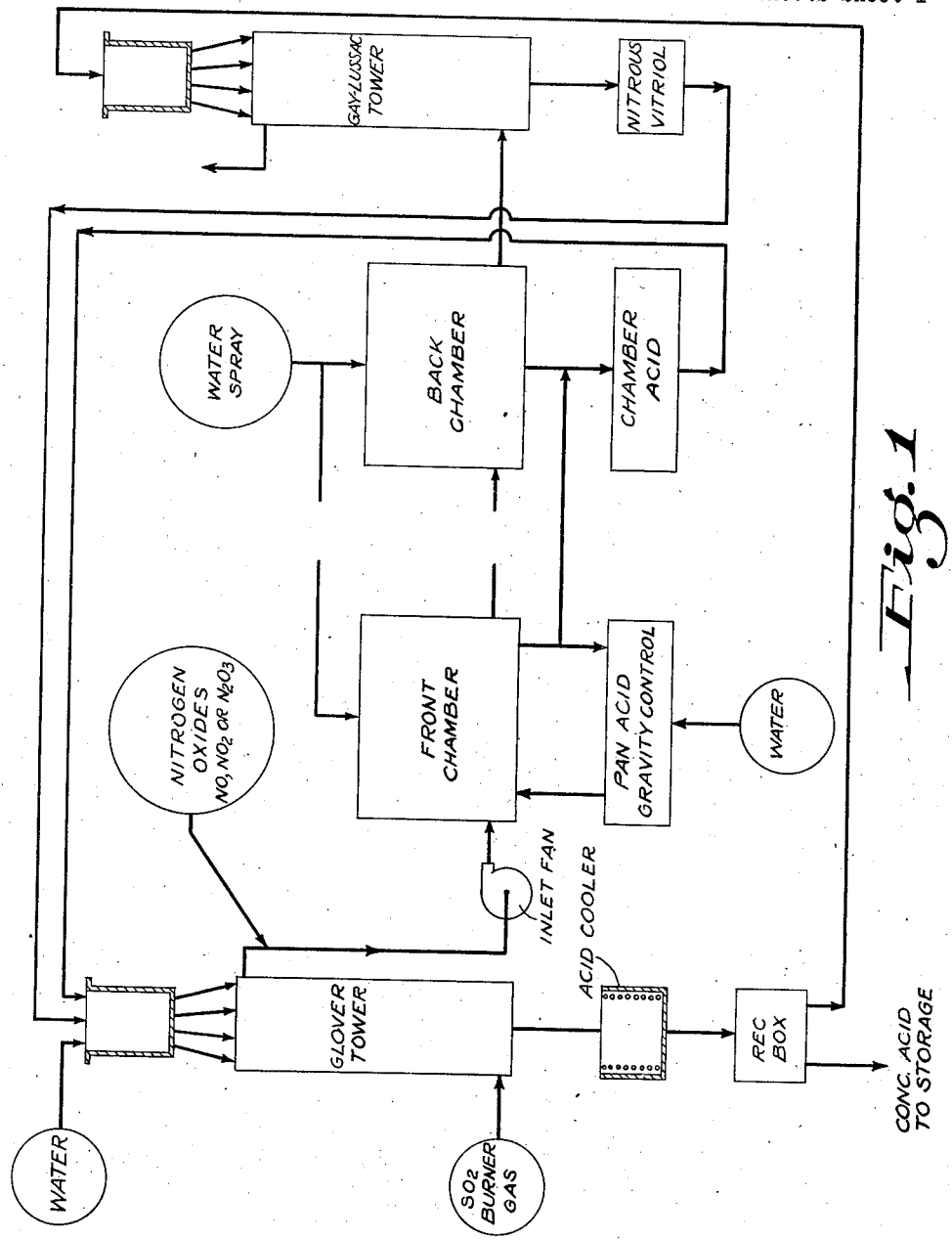

March 21, 1944.  J. A. JENEMANN ET AL  2,344,616
MANUFACTURE OF SULPHURIC ACID
Filed Nov. 23, 1940  2 Sheets-Sheet 2

Joseph A. Jenemann
Eldon B. Hollis
INVENTORS
BY
ATTORNEY

Patented Mar. 21, 1944

2,344,616

UNITED STATES PATENT OFFICE 2,344,616

MANUFACTURE OF SULPHURIC ACID

Joseph A. Jenemann, Drexel Hill, Pa., and Eldon B. Hollis, Woodbury, N. J., assignors to E. I. du Pont de Nemours & Company, Wilmington, Del., a corporation of Delaware Application November 23, 1940, Serial No. 366,838

9 Claims. (Cl. 23—168)

This invention relates to the manufacture of sulphuric acid in lead chamber systems and provides simple and efficient methods for increasing production in such systems without requiring material alteration in equipment.

A lead chamber system for the manufacture of sulphuric acid in its simplest and probably most common form includes a burner for producing sulphur dioxide gas, a Glover tower for denitrating nitrous vitriol and concentrating chamber acid, a series of lead chambers and a Gay-Lussac unit for denitrating the spent gases. The hot burner gases are passed thru the Glover tower to provide the heat necessary for denitration and concentration in this tower. The gases evolved contain nitre, sulphur dioxide and water vapor. When the gaseous mixture of this character is passed into the chambers a reaction takes place, resulting in the formation of nitrosylsulphuric acid which on being diluted with water in the proper concentrations splits up to yield sulphuric acid and nitre. Ordinarily neither the amount of water evolved in the Glover tower nor the amount of nitre recovered there are sufficient for the reaction so that additional nitre must be supplied either by the decomposition of a nitrate or by ammonia oxidation, and also additional water must be supplied either as steam or as a water spray introduced directly into the chambers. The chambers are large empty rooms made of lead. The bottom is made as a large pan and is adapted to hold a substantial body of acid.

As the reaction takes place in the chamber a mist forms which may be considered as a solution of nitrosylsulphuric acid in aqueous sulphuric acid. The reaction is exothermic so that the temperatures obtaining in the center of the chamber are relatively high as compared with those adjacent the lead walls which radiate heat to the surrounding atmosphere. As the mist particles approach the relatively cool walls their temperature is lowered and their affinity for water consequently increased. An acid consequently condenses on the walls of the chambers which is more dilute than the mist acid. The acid which thus forms drips into the pan and is herein designated as drips acid. The acid which accumulates in the pan is known as pan acid. Pan acid does not have the same composition as the drips acid because there is also a direct condensation of the mist acid in the pan acid. The mist acid thus condensed is many times greater than that condensed on the walls. If the pan acid is maintained at the proper strength the nitrosylsulphuric acid in the mist acid is decomposed immediately and nitre is released back into the chamber space. In operation the gravity of the drips acid and the pan acid are observed and correlated in order to keep the system properly operating and specifically to avoid an excess or deficiency of water in the chambers.

There are some special methods of operating lead chamber systems which involve one or more of the following: spraying acid into the chamber, usually in a cool or diluted form and usually obtained by recirculation of pan or chamber acid; operating with such strong pan acid that decomposition of the mist acid on condensation is incomplete; or the spraying of such an acid, which is essentially a dilute nitrous vitriol, into the chambers. It is to be understood that the lead chamber system herein referred to does not include any of these special methods of operation but contemplates normal operations of the chambers in which sulphuric acid is not sprayed into the chamber and in which the pan acid is sufficiently dilute to decompose nitrosylsulphuric acid. Systems so operated we shall designate herein as "normal space-chamber" operations or systems.

According to the generally accepted theories and practice in normal space-chamber operation, the capacity of a given system has been considered to be limited by the ability of the system to dissipate the heat of the reaction. Most expedients for increasing the capacity of such systems have accordingly been directed toward improving the cooling facilities. Irrespective, however, of what devices and expedients have been employed for this purpose heretofore, a maximum capacity is invariably reached above which it is not practical or feasible to provide further cooling means.

When the burden is increased beyond such a point, the equilibrium between water in the gas and water in the mist acid is shifted toward the water vapor phase thereby necessitating the addition of more and more water as the temperature rises for the formation of acid of the optimum specific gravity. Contrary to general belief, this results in an excessive amount of water because, tho the water so introduced remains in the vapor phase in the front chamber and does not affect the drips acid or the pan acid, it inevitably follows that at some subsequent point in the system condensation must take place. This usually occurs in the back chambers and frequently in the exit flues leading to the Gay-Lussac towers of the nitre recovery plant. In the latter case the condensate is too weak properly to dehydrate the gas so that an excessive quantity of water vapor is carried over into the Gay-Lussac tower.

Condensation of the excess water in the back part of the system leads to extensive corrosion problems and loss of nitre. The dilute acid formed on the relatively cold walls of the back chambers as a result of this condensation absorbs nitre to form nitric acid which rapidly attacks the lead walls. The same corrosion problem also occurs in the exit flues. Moreover, the water vapor carried over into the Gay-Lussac tower dilutes the absorbing acid and causes loss of nitre both by reason of dilution of the absorbing acid and the increased temperature due to the heat of dilution.

We have now found that further increase in burden may be made without regard to the consequent increase in temperature which may advantageously be allowed to rise beyond the point at which the differential between the temperature of the mist acid and that of the pan acid exceeds 55° F., if the resulting shift in the equilibrium toward the water vapor phase is disregarded and the additional water required is introduced by continuously diluting the pan acid of at least the front chamber from an external source, that is to say, a source other than condensation within the chamber. In this manner the burden may be substantially increased without appreciably increasing the losses due to corrosion and loss of nitre and advantage may be taken of the greater radiating capacity of the chamber due to the higher differential referred to the surrounding temperatures.

When we speak of disregarding the shift in equilibrium toward the water vapor phase, we mean only that the water vapor in the gas is not deliberately increased to maintain proper strength pan acid. In other words the amount of water introduced into the chamber space is maintained so low that the combination of drips acid and mist acid would give a pan acid which if left alone would soon become too concentrated effectively to decompose nitrosylsulphuric acid. This, in view of the higher temperatures and the consequent shift in the equilibrium toward the water vapor phase, is tantamount, according to general belief, to working with an insufficiency of water. We have found that an apparent deficiency of water vapor at this point is in no wise deleterious, providing the "deficiency" is compensated by continuously diluting the pan acid of at least the first chamber from an external source whereby its strength is controlled independently of the drips acid and mist acid and maintained sufficiently dilute to decompose nitrosylsulphuric acid. Operating in this manner the burden may be increased to a degree such that the normal differential in temperature between the mist acid and the pan acid is greater than 55° F. and such that markedly improved radiation characteristics are imparted to the chambers. Thus simply by introducing water into the pan acid of at least the front chamber in the amount required to maintain the pan acid at a concentration which will decompose nitrosylsulphuric acid we are able to step up the burden without incurring any additional losses due to corrosion or loss of niter.

We do not intend to imply that the deficiency of water vapor in the front chamber should be compensated by vaporization of water from the pan acid. On the contrary, the preferred state of the equilibrium in the chamber obtaining under the conditions of intensive working described is such that the partial pressure of the water vapor exceeds the water vapor pressure of the pan acid or, more simply, that the vapor pressure of the mist acid is greater than that of the pan acid. In other words, the pan acid and the supernatent vapor are not in equilibrium, more water in the vapor phase being transformed to the liquid phase than from the liquid phase to the vapor phase.

It follows from the foregoing that operation of a normal space chamber system according to this invention is characterized by external pan acid dilution in at least the front chamber, by a deficiency of water vapor in the front chamber such that the combined mist acid and drips acid would be too strong effectively to decompose the nitrosylsulphuric acid, by a temperature differential of at least 55° F. between the pan acid and the mist acid and equilibrium conditions such that the partial pressure of the water vapor exceeds the partial pressure of the pan acid. In other words, the advantages of this invention are obtained when the pan acid of at least the front chamber is continuously diluted from an external source in the amount required to maintain the strength of the pan acid at such value as will decompose nitrosylsulphuric acid while sulphur dioxide, nitrogen oxides, and water vapor are introduced at a rate and in proportions such that the combined strength of the mist acid and drips acid exceeds the strength of the pan acid and the vapor pressure of the mist acid exceeds the vapor pressure of the pan acid.

In the accompanying flow sheet, Figure 1, we have illustrated the application of our invention to a normal space-chamber system. The legends in the circles indicate the materials used in the process. The flow lines leading therefrom indicate the points at which the several materials are introduced into the system. Only the front and back chamber are illustrated, it being understood that a number of intermediate chambers may intervene. The sulphur dioxide burner gas is led thru a Glover tower, a series of lead chambers, and a Gay-Lussac tower in the ordinary manner, chamber acid and nitrous vitriol being supplied to the Glover tower and stripped acid being supplied to the Gay-Lussac tower according to the usual nitre recovery systems.

The application of our invention to such a system is illustrated in connection with the front chamber where the pan acid is withdrawn, diluted with water and reintroduced into the chamber, the surplus being led off to the nitre recovery system. In this manner the bottom acid may be maintained at any desired specific gravity independently of the state of equilibrium obtaining in the front chamber and the burden may be increased independently of the increase in temperature in the chamber.

The amount of water which will be introduced into the bottom acid of the first chamber will vary according to the circumstances. All that is required in this respect, however, is that water be added in the amount required to maintain the bottom acid at a suitable strength. What strength is to be seleced for this purpose depends upon the circumstances and to some extent on the preference of the operator, the optimum being that gravity at which excessive nitre does not remain in solution either as nitric acid or as nitrosylsulphuric acid. The amount of water must be sufficient to keep the pan acid strength below that at which nitrosylsulphuric acid is stable, that is to say, below that strength which would result in an acid which would be more properly classed as dilute nitrous vitriol than chamber acid. Too much dilution should be avoided as otherwise formation of nitric acid will cause corrosion.

Inasmuch as these conditions are well understood in the art no further criteria need be given with respect to the strength of the pan acid. It may be mentioned, however, that for most purposes a strength of about 62 per cent $H_2SO_4$ is most desirable. Normal space-chamber plants are frequently operated, however, with a pan acid strength as low as 55 per cent $H_2SO_4$ and as high as 71 per cent $H_2SO_4$ (about 45° to 55° Baumé), the latter being on the border line between a chamber acid and a dilute nitrous vitriol. Ordinarily chamber acid does not have a gravity as high as 55° Baumé. In the processes of this invention the specific gravity of the bottom acid is maintained independently of the specific gravity of the acid of formation (combined drips acid and mist acid), and consequently may be maintained substantially less than 45° Baumé as long as it is not allowed to become so dilute that corrosion is excessive. Consequently, the operator may select a specific gravity which according to his experience will be most suited to the process. "Acid strength" and "specific gravity," for the purpose of this invention, may be considered as equivalent tho the latter may vary somewhat according to the temperature.

In order that the invention may be more fully understood reference may be had to the following table which is illustrative of conditions existing in the front chamber of a system such as illustrated in Figure 1:

*Table I*

| | | |
|---|---|---|
| Pan acid gravity | °Bé at 60° F | 51.8 |
| Pan acid temperature | °F | 203 |
| Pan acid vapor pressure | mm | 96 |
| Mist acid gravity | °Bé. at 60° F | 60.2 |
| Mist acid temperature | °F | 280 |
| Mist acid vapor pressure | mm | 104 |

The invention may be better understood if we consider for the moment what happens in a normal chamber system as the burden is increased. In the first place there is a rise in the temperature of the front chamber due to the more intensive working in that chamber. This causes a shift in the equilibrium toward the water vapor phase and consequently an increase in the strength of the mist acid. As the burden is increased it is consequently considered necessary to introduce more water vapor into the system to maintain the strength of gravity of the mist acid at the proper value.

In many systems so much water vapor had to be introduced into the first chamber for this purpose that the water sprays on the back chambers may be cut out entirely. Even when this was done so much water had to be introduced into the first chamber to maintain the proper gravity of the mist acid that the drips acid in the back chambers and the exit flue condensate often dropped as low as 30° Bé. and even less. Such dilute acid absorbs large quantities of nitre in the form of nitric acid and causes severe corrosion of the back chamber walls and the exit flue.

The corrosion problem, however, is only part of the difficulty involved because, if a weak acid is condensed in the last chamber and in the exit flue leading to the Gay-Lussac tower, large quantities of water will remain in the vapor phase and be carried over into the Gay-Lussac tower. As a result the acid circulated over the Gay-Lussac becomes diluted to such an extent as to impair recovery of nitre. In some cases this may be partially remedied by increasing the gravity of the acid so circulated, but the production of an acid of a higher gravity entails disadvantages in operation of the Glover tower. In addition the heat of dilution also raises the operating temperature of the tower and consequently impairs nitre recovery.

While we have illustrated our invention with external pan acid gravity control applied to the first chamber only, it will be understood that any or all of the back chambers may be included or that the gravity of any or all the back chambers may be independently controlled in a like manner.

In some systems the chamber pans are connected in series with the pan acid of each chamber flowing into the pan acid of the next preceding chamber. In such a system without external pan acid control the pan acid of the front chamber, being usually stronger than that of the back chamber, would be diluted somewhat but the extent of the dilution would be negligible. Moreover, water so introduced would involve merely a transfer of water from one part of the system to another. In our processes it is essential that the water be added from an external source. In other words, part of the water required for making chamber acid is added as water vapor in the usual manner and the remainder is added directly to the pan acid.

Figure 2:
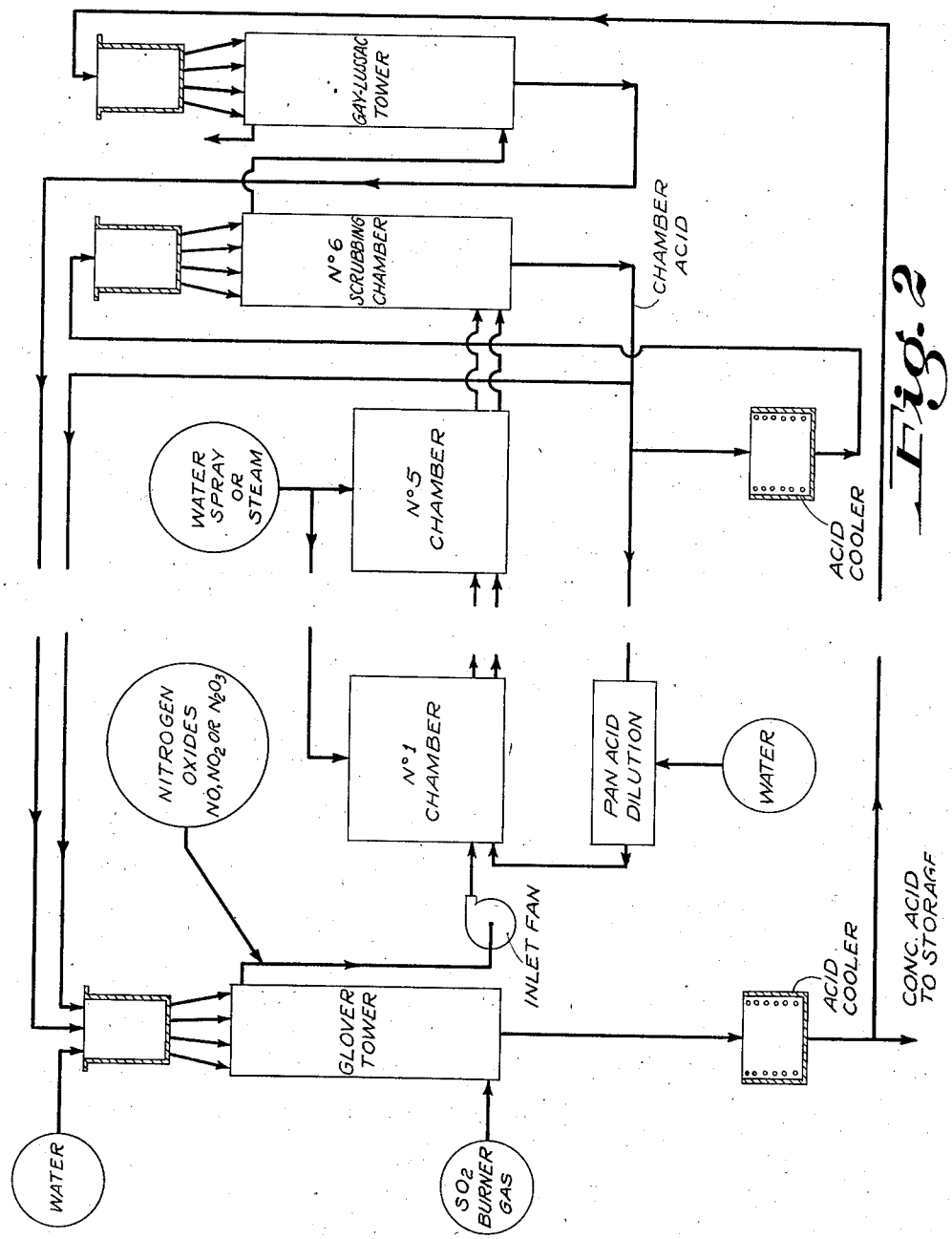

External pan acid control may be applied advantageously in a similar system as illustrated in Figure 2, but the flow of the pan acid from chamber to chamber is co-current with the flow of gas rather than counter-current. In this system chamber acid is obtained from the scrubbing chamber No. 6. A portion is cooled and circulated over the scrubbing chamber to cool and dry the gas as set forth in application of L. K. Wyatt, Serial No. 325,538 filed May 23, 1940. Another portion which may be drawn off either before or after the cooler is diluted with water and pumped into the front (No. 1) chamber. The balance is passed on to the Glover tower for concentration.

The conditions obtaining in the various chambers in a typical application of the invention are set forth in the following table:

*Table II*

| | Chamber No. | | | | | |
|---|---|---|---|---|---|---|
| | 1 | 2 | 3 | 4 | 5 | 6 |
| Pan acid gravity °Bé. at 60° F | 39.5 | 42.9 | 45.9 | 47.7 | 48.9 | 49.2 |
| Pan acid temperature °F | 145 | 160 | 157 | 152 | 143 | 106 |
| Pan acid vapor pressure mm. Hg | 75 | 90 | 63 | 48 | 30 | 9 |
| Mist acid gravity °Bé. at 60° F | 60.8 | 61.9 | 62.9 | 62.8 | 62.2 | 55.1 |
| Mist acid temperature °F | 288 | 289 | 281 | 261 | 236 | 131 |
| Mist acid vapor pressure mm. Hg | 105 | 77 | 45 | 30 | 18 | 7 |

While water as such is the most convenient source of water for diluting the pan acid to the desired specific gravity, it will be apparent that a dilute sulphuric acid may be employed to the same end. No especial advantage is obtained, however, except that part of the heat of dilution may be dissipated prior to diluting the pan acid. The same effect may be obtained with water as such, however, by including a cooling means in the external circuit of the pan acid gravity control. Such a cooling means has two other advantages. It reduces corrosion in the pumping equipment and reduces the partial pressure of the pan acid and thus reduces carry over of water vapor into the other chambers.

It is also possible to apply external dilution according to the invention to chambers other than the front chamber. This would be of advantage where the front chamber was provided with cooling means adequate to dissipate the heat of the reaction whereas the second was not. Similar conditions may obtain farther along in the system making it expedient to employ external dilution to chambers other than the first or the second but such conditions would be unusual. Generally speaking, our invention finds its greatest usefulness when applied either to the front chamber or to all the chambers. In the latter case the necessity of observing the pan acid and checking the gravity against the gravity of the mist acid and drips acid is eliminated. All that is required is to maintain the chamber acid at the desired gravity by introducing the necessary amount of water directly to the portion circulated to the front chamber and to adjust the other conditions to give the desired gravities for the drips acid and the exit flue condensate.

It will be understood that in some cases the operating conditions may be such that evaporation of water from the pan acid actually does take place but this is not a necessary or desirable condition and can be avoided either by cooling the acid circulated to the pan or by increasing the strength of the pan acid or by increasing the burden. In all cases only slight differences in operating condition may bring about a change from a condition in which water is not evaporated to one in which it is so that it is sometimes difficult to ascertain in just which way the system is off equilibrium. Thus, while in the preferred form of the invention it is desirable to operate under conditions such that the vapor pressure of the mist acid exceeds the vapor pressure of the pan acid by virtue of their differential in gravity and temperature it is nonetheless considered part of the invention when the temperature differential is of the same order of magnitude, that is to say, above 55° F., notwithstanding that the gravity differential may be such that the vapor pressure of the pan acid exceeds that of the mist acid.

It will be understood that various modifications may be made in the process in adapting them to different types of chamber systems and that such variations as come within the spirit of the invention are intended to be within the scope of the appended claims.

"Nitrogen oxides" as used herein will, of course, be understood as the oxides of nitrogen commonly used in chamber processes where recovered from the nitrous vitriol in the Glover tower, or obtained by oxidation of ammonia, decomposition of nitrates, or in some other manner.

This application is a continuation-in-part of our copending application Serial No. 195,952, filed March 15, 1938.

We claim:

1. In a process for the manufacture of sulphuric acid in normal space-chamber systems the steps of introducing part of the water required for the production of a chamber acid of a predetermined strength directly from an external source into the pan acid of at least one chamber in the amount required to maintain the pan acid at a predetermined strength which is below that at which nitrosylsulphuric acid would remain dissolved and undecomposed and introducing the balance of the required water along with sulphur dioxide and nitrogen oxides into the reaction space at a rate and in proportions such that the combined strength of the mist acid and the drips acid exceeds that of the pan acid, the amount of water added to the pan acid being so proportioned thereto as to keep the strength of the pan acid substantially constant, and maintaining a rate of reaction in the chamber sufficient to create a temperature differential between the pan acid and the mist acid such that the vapor pressure of the mist acid exceeds the vapor pressure of the bottom acid.

2. In a process for the manufacture of sulphuric acid in normal space-chamber systems the steps of continuously diluting with water from an external source the pan acid of at least the front chamber in the amount required to keep the strength of the pan acid below that at which nitrosylsulphuric acid would remain dissolved and undecomposed, and introducing sulphur dioxide, nitrogen oxides, and water vapor into the reaction space at a rate and in proportions such that the combined strength of the mist acid and the drips acid exceeds that of the pan acid, the amount of water added to the pan acid being so proportioned thereto as to keep the strength of the pan acid substantially constant, and maintaining a rate of reaction in the chamber sufficient to create a temperature differential between the pan acid and the mist acid such that the vapor pressure of the mist acid exceeds the vapor pressure of the pan acid.

3. In a process for the manufacture of sulphuric acid in normal space-chamber systems the steps comprising continuously circulating the pan acid of at least the front chamber thru an external circuit, continuously introducing water into the external circuit and introducing sulphur dioxide, nitrogen oxides, and water vapor into the reaction space at a rate and in proportions such that the combined strength of the mist acid and the drips acid exceeds that of the pan acid, the amount of water added to the pan acid being so proportioned thereto as to keep the strength of the pan acid substantially constant, and maintaining a rate of reaction in the chamber sufficient to create a temperature differential between the pan acid and the mist acid such that the vapor pressure of the mist acid exceeds the vapor pressure of the pan acid.

4. In the process for the manufacture of sulphuric acid in normal space-chamber systems the steps comprising introducing water into the pan acid of at least the front chamber in the amount required to maintain the specific gravity of the pan acid below about 55° Baumé and introducing sulphur dioxide, nitrogen oxides, and water vapor into the reaction space at a rate and in proportions such that the combined strength of the mist acid and the drips acid exceeds that of the pan acid, the amount of water added to the pan acid being so proportioned thereto as to keep the strength of the pan acid substantially constant, and maintaining a rate of reaction in the chamber sufficient to create a temperature differential between the pan acid and the mist acid such that the vapor pressure of the mist acid exceeds the vapor pressure of the pan acid.

5. In a process for the manufacture of sulphuric acid in normal space-chamber systems the steps comprising introducing water into the pan acid of at least the front chamber in the amount required to maintain the specific gravity of the pan acid at about 50° Baumé and introducing sulphur dioxide, nitrogen oxides, and water vapor into the reaction space at a rate and in proportions such that the combined strength of the mist acid and the drips acid exceeds that of the pan acid, the amount of water added to the pan acid being so proportioned thereto as to keep the strength of the pan acid substantially constant, and maintaining a rate of reaction in the chamber sufficient to create a temperature differential between the pan acid and the mist acid such that the vapor pressure of the mist acid exceeds the vapor pressure of the pan acid.

6. In a process for the manufacture of sulphuric acid in normal space-chamber systems the steps of introducing part of the water required for the production of a chamber acid of a predetermined strength directly from an external source into the pan acid of at least one chamber in the amount required to maintain the pan acid at a predetermined strength which is below that at which nitrosylsulphuric acid would remain dissolved and undecomposed and introducing the balance of the required water along with sulphur dioxide and nitrogen oxides into the reaction space at a rate and in proportions such that the combined strength of the mist acid and the drips acid exceeds that of the pan acid, the amount of water added to the pan acid being so proportioned thereto as to keep the strength of the pan acid substantially constant, and maintaining a rate of reaction in the chamber sufficient to create a temperature differential between the pan acid and the mist acid of at least 55° F.

7. In a lead chamber process for the manufacture of sulphuric acid in which sulphuric acid is not sprayed into the front chamber as a spray, in which there is a deficiency of water vapor in the front chamber such that the combined mist acid and drips acid is too strong effectively to decompose nitrosylsulphuric acid and in which a body of pan acid is maintained at the bottom of the chamber, the steps of continuously introducing water from an external source into the pan acid of said front chamber thereby to and in sufficient quantity to dilute and to maintain the pan acid therein at a substantially constant strength such that nitrosylsulphuric acid introduced with the mist and drips acids is decomposed, and maintaining a rate of reaction in said chamber sufficient to maintain a temperature differential between the pan acid and the mist acid of at least 55° F.

8. In a lead chamber process for the manufacture of sulphuric acid in which sulphuric acid is not sprayed into the front chamber as a spray, in which there is a deficiency of water vapor in the front chamber such that the combined mist acid and drips acid is too strong effectively to decompose nitrosylsulphuric acid and in which a body of pan acid is maintained at the bottom of the chamber, the steps of continuously circulating the pan acid thru at least the front chamber in co-current flow with the gases therethru and in return flow thru an external circuit, and introducing water into the external circuit in the amount required to maintain the gravity of the pan acid sufficiently low to decompose the nitrosylsulphuric acid introduced by the mist acid and the drips acid, and maintaining a sufficiently high rate of reaction in the front chamber to provide a mist acid temperature of at least 55° F. in excess of the pan acid temperature.

9. In a lead chamber process for the manufacture of sulphuric acid in which sulphuric acid is not sprayed into the front chamber as a spray, in which there is a deficiency of water vapor in the front chamber such that the combined mist acid and drips acid is too strong effectively to decompose nitrosylsulphuric acid and in which a body of pan acid is maintained at the bottom of the chamber, the steps of continuously circulating the pan acid thru at least the front chamber in co-current flow with the gases therethru and in return flow thru an external circuit, and introducing water into the external circuit in the amount required to maintain the gravity of the pan acid sufficiently low to decompose the nitrosylsulphuric acid introduced by the mist acid and the drips acid, and maintaining a sufficiently high rate of reaction in the front chamber to provide a temperature differential between the pan acid and the mist acid such that the vapor pressure of the mist acid exceeds the vapor pressure of the bottom acid.

JOSEPH A. JENEMANN.
ELDON B. HOLLIS.